United States Patent [19]

Shinskey

[11] 4,030,986
[45] June 21, 1977

[54] CONTROL FOR MAXIMIZING CAPACITY AND OPTIMIZING PRODUCT COST OF DISTILLATION COLUMN

[75] Inventor: Francis G. Shinskey, Foxboro, Mass.
[73] Assignee: The Foxboro Company, Foxboro, Mass.
[22] Filed: May 14, 1975
[21] Appl. No.: 577,497
[52] U.S. Cl. .................................. 203/2; 202/160; 196/132
[51] Int. Cl.² .......................................... B01D 3/42
[58] Field of Search ....................... 235/1; 203/1–3; 202/160; 196/132

[56] References Cited
UNITED STATES PATENTS

| | | | |
|---|---|---|---|
| 2,882,693 | 4/1959 | Clay | 202/160 |
| 3,268,420 | 8/1966 | Webber et al. | 202/160 |
| 3,342,701 | 9/1967 | Rijnsdorp | 202/160 |

Primary Examiner—Norman Yudkoff
Assistant Examiner—J. Sofer
Attorney, Agent, or Firm—Frank J. Fleming

[57] ABSTRACT

A method and apparatus for controlling the operation of a distillation column which utilizes cost factors to achieve the best economical production of a product within acceptable purity limits while maintaining the column at maximum operating capacity. The control is based on a series of priorities in which each of the following control signals is selectively used in turn to modify the control the heat-input to the column; cost factors applying to the column, cost factors applying to the several columns in the system, the purity of the product, the operating pressure limit of the column and, for lighter products, the rate of fluid velocity through the column. For heavier products, the rate of fluid velocity through the column is used independently of the heat-input control to restrict the flow of overhead product to the condenser to increase the back pressure on the column.

23 Claims, 3 Drawing Figures

CONTROL FOR MAXIMIZING CAPACITY AND OPTIMIZING PRODUCT COST OF DISTILLATION COLUMN

FIELD OF INVENTION

This invention relates generally to the control of fractionation distillation. It is more particularly related to controlling a column in order to make the most economical separation of feed stock commensurate with producing a product within acceptable purity limits while maintaining the column at its maximum operating capacity practical for that purpose.

DESCRIPTION OF THE PRIOR ART

The control of distillation columns is in a crowded field of art. The following listed art is cited as representative of the field of this invention.

1. Shinskey, F. G.: "The Value of Process Control", *Oil and Gas journal*, Feb. 18, 1974.
2. Shinskey, F. G.: "Process Control Systems", McGraw-Hill Book Company, Inc., New York 1967.
3. Shinsekey, F. G.: "The Material Balance Concept in Distillation Control", *Oil and Gas Journal*, July 14, 21, 28, 1969.
4. Shinskey, F. G.: "Stable Distillation Control through Proper Pairing of Variables", *I.S.A. Transactions*, Volume 10, No. 4, 1971.
5. "Technical Data Book — Petroleum Refining", American Petroleum Institute, 2nd Edition, Pages 8–11.
6. Jarvis, H. C.: "Process Computer — They Do Pay Off in Refineries", *Oil and Gas Journal*, Dec. 3, 1973.

Walker U.S. Pat. Nos. 2,816,858 and 3,271,269
Webber U.S. Pat. No. 2,976,234
Shinskey U.S. Pat. No. 3,394,053
Constantikes U.S. Pat. No. 3,427,228
Rogers U. S. Pat. No. 3,607,665

None of the articles or patents teach a control combination which includes cost factors and operating limitations for the economical production of a product within acceptable purity limits while maintaining the column safely at maximum operating capacity. The Shinskey articles numbered 3 and 4 and his patent are representative of prior art control systems. The other cited patents disclose various control systems which include means for preventing column flooding. In the present invention, the control of flooding is only one step or element of the total combination and is used in a unique manner with respect to the other variables of the system.

SUMMARY OF THE INVENTION

A control system for a fractionation column, is often operated so as to produce a product that is considerably purer than required in order to avoid the losses associated with producing off specification material. When the purity specifications are set higher than required, the column usually must be operated considerably below its capacity.

In addition to operating inefficiently, the control system may not recover as high a percentage of the desired component from the feed. As recovery increases, so does the profit made by selling the product. Profits will be greater when the product just satisfies the purity specifications with the less valuable components included in the product.

When operating a column at near peak capacity, upsets may cause instabilities such as flooding, which require recovery periods sometimes lasting serveral hours during which acceptable product can not be produced.

Thus, it is an object of this invention to provide a control system for fractionation columns which solves the above problems.

It is another object of this invention to operate a fractionation column at peak capacity for producing a product of acceptable purity.

It is still a further object of this invention to operate a column to recover a product of acceptable purity with improved profitability.

It is still another object of this invention to provide a control system for a column which maintains production at the peak capacity of the column and with a desirable profitability withot exceeding safe process limits.

It is still a further object of this invention to control a column which maintains production and profitability at its peak within safe limits without causing upsets which require long recovery periods.

This invention is achieved by controlled the heat-input to the column at a desired value and selectively modifying that desired value in accordance with the value of one of several other variables on the following established order to priorities:

1. The column pressure must not exceed a safe value.
2. The quality of the product being controlled must not be allowed to fall below a desired value, except when priority (1) is exercised.
3. The boilup rate calculated to optimize the cost factor for the entire distillation system (including other columns) should be applied except when higher priorities (1and (2) are exercised.
4. The boilup rate calculated to optimize the cost factor of this column alone (local) should be applied when no other priorities are exercised.

In addition to the above priorities, the pressure in the column must be maintained at a high enough value to prevent flooding. For the separation of lighter products, the value of the variable indicating approaching flooding is applied with the highest priority to reduce heat-input. For the separation of heavier products, the value of the variable indicating approaching flooding is applied independently of the control of the heat-input to reduce heat removal.

Cost factors are defined as those conditions and related decisions which are combined to operate a fractionation process more profitably. The following is a discussion of the condition and related decisions which are involved without including calculations already set forth in the cited prior art.

An important condition in the cost factor is an improvement in recovery with the associated reduction in energy consumption. Recovery is defined herein as the amount of salable product made per unit of that component in the feed. Recovery will be greatest whehn the product just satisfies its specification and no more. This is due to the fact that the maximum amount of the less valuable impurities are in the product being produced. Thus, the closer the product is to its specifications, the higher the recovery and, consequently, profit. It is therefore advantageous to modify the heat-input to a column in a manner dictated by the cost factor involving recovery and related energy at times when the product purity is within acceptable limits. Setting the product purity at a value that just satisfies its purity specifications relaxes the control requirement sufficiently for the use of the cost factor.

In controlling the local column to achieve more profit by improved recovery, the prior column in a distillation system no longer has to remove as much of the lesser valuable component feed to the next column. Consequently the reboiler for the prior column does not have to be operated as hard. This results in a credit for reduced energy consumption in the prior column. This credit may be used, along with other related conditions, in calculating the cost factor for the entire fractionation system that is used to modify the heat-input when the product purity is within acceptable limits.

The local column capacity is normally maximized by operating it at the lowest pressure attainable with the available condensor cooling. The reason for this is that the relative volatility between the components in the feed being separated is improved with the lower pressure. When separating compounds which polymerize, another saving is realized by the resulting lower operating temperature which reduces the rate of fouling. For every 20° F reduction in temperature, the rate of fouling is halved, resulting in doubling the intervals between cleanings.

The pressure at which a column will operate depends also in ambient conditions. On cool days the effective cooling is increased, resulting in a lower operating pressure.

The primary disadvantage of operating at mimimum pressure is that the vapor density is also at a minimum, which maximizes the vapor velocity for a given boilup rate and ambient condition. If vapor velocity increases to too high a value, it may cause flooding of the column. As pointed out earlier herein, once flooding occurs, it may require a long time to bring the column back under control. In this invention, flooding is avoided by measuring the differential pressure in the column as an indication of the vapor velocity rate. When the differential pressure is at a value indicating the approach of a flooding condition its control signal is used to increase the column pressure for heavier products, but decreases it for lighter products. For heavier products, the control signal is used to throttle the flow of overhead product to the condenser. For lighter products, the control signal is used to modify the heat-input to the column and exercises priority over the purity control.

DESCRIPTION OF THE DRAWINGS

The objects and advantages of this invention will be more fully understood from the description taken in connection with the accompanying drawings, wherein.

DESCRIPTION OF THE PREFERRED EMBODIMENTS

Figure 1:
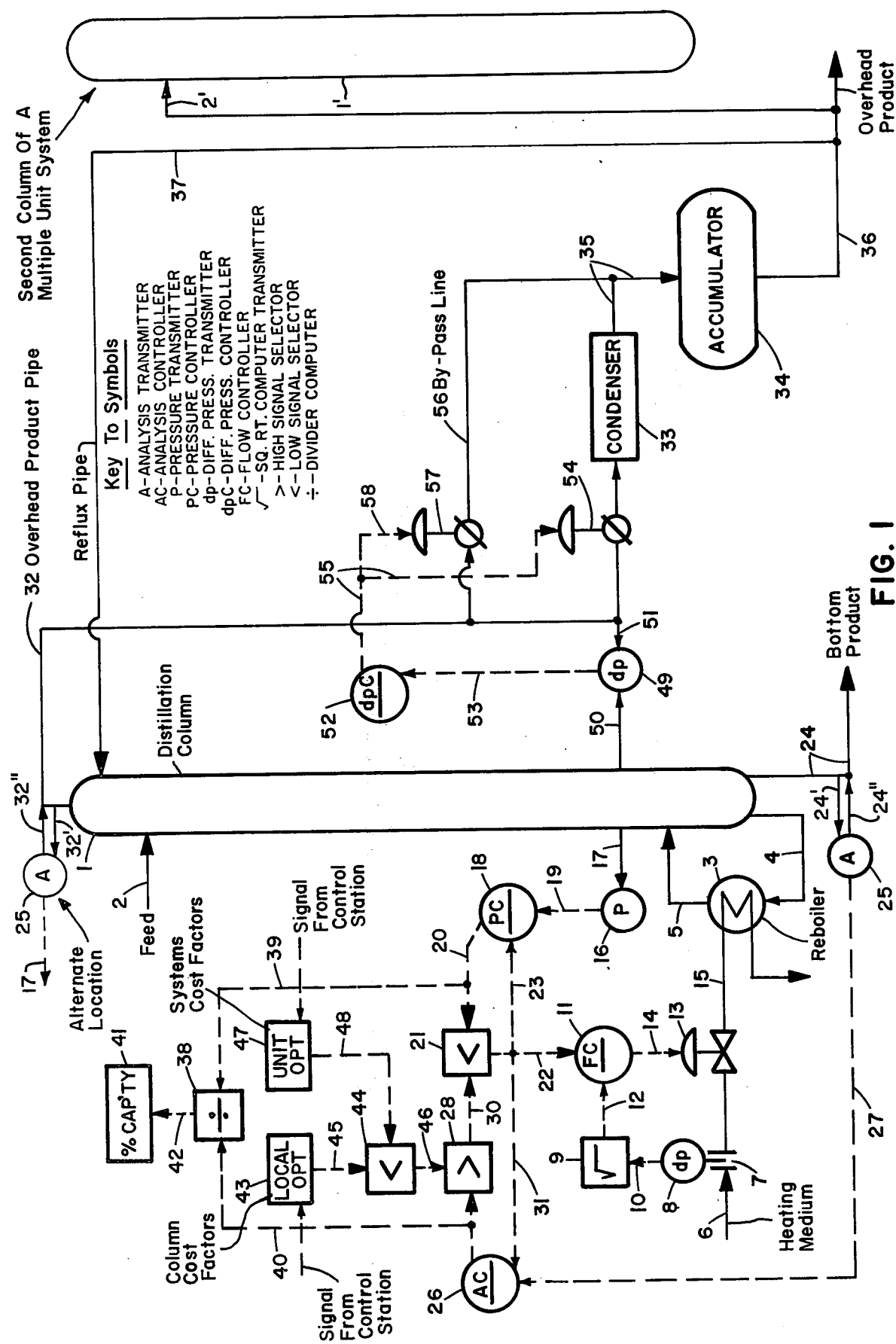
FIG. 1 is a diagramatic showing of a fractionation column and control system suitable for separating relatively heavy distillates such as pentanes.

Referring to FIG. 1, distillation column 1 may be one column in a multiple-unit fractionation system and hereinafter will be considered the local column. The feed 2 to column 1 may be either the overhead product or the bottom product from a prior column of the system, depending on the manner in which the columns of the system are interconnected. The fluid supplied to feed 2 may generally be of known composition and controlled at a preselected rate. Inasmuch as threse are well known control practices and not a part of this invention, they are not shown in FIGS. 1 and 2. A reboiler 3 is connected to the column 1 to receive fluid from the column through pipe 4 and, after adding heat, returns the fluid through pipe 5 to the column. Heat is supplied, usually as steam, through pipes 6 and 15 to reboiler 3. An orifice plate 7 and control valve 13 are inserted in the steam pipe between pipes 6 and 15. A differential pressure transmitter 8 connected to orifice plate 7 detects the differential pressure across the orifice plate 7 and transmits a signal proportional thereto to a square root computer 9 through line 10. The output signal from computer 9 is transmitted through line 12 to flow controller 11. In turn, the output signal from flow controller 11 is transmitted through line 14 to control valve 13. The orifice 7, differential pressure transmitter 8, square root computer 9, flow controller 11 and valve 13 form a flow control loop which controls the rate of flow of steam to reboiler 3 at a rate established by the set point value set in the flow controller 11. The set-point of flow controller 11 is automatically adjusted by an output signal received from other apparatus to be described. The received output signal adjusts the set-point of flow controller in a direction and amount which is proportional to the received output signal. The term "value" is used herein to mean the amplitude of a variable such as pressure, flow, purity and the like.

A pressure transmitter 16 is connected by pipe 17 to column 1 and senses the pressure of the fluid in column 1. The output signal from pressure transmitter 16 is transmitter through line 19 to pressure controller 18 the output signal therefrom varying in a direction and amount which is inversely proportional to the operating pressure in column 1. In turn the output signal from pressure controller 18 is transmitted through line 20 to low signal selector 21. The set point of pressure controller 18 is set at the highest pressure value at which column 1 may safely be operated; i.e., a pressure at which no physical damage will occur to column 1. Low signal selector 21 connects that output signal to flow controller 11 through line 22. The output signal from pressure controller 18 received by flow control 11 modifies the set point of flow controller 11 to adjust the rate of flow of steam to the reboiler return 3 to the pressure in column 1 to its set point valve. When the outpt signal from pressure controller 18 is indicating that the pressure in column 1 is above its safe operating limit, the rate of flow of steam is reduced and conversely when the pressure is below its safe operating limit, the rate of flow of steam is increased.

The bottom product is removed from column 1 through pipe 24 and overhead product is removed through pipe 32. In FIG. 1, a transmitting analyzer 25 is shown connected to pipe 24 by sample line 24' and return line 24'' in order to analyze the purity of the bottom product This invention also embraces an alternate system in which the analyzer 25 is connected to pipe 32 instead of to pipe 24, in order to analyze the overhead product. The output signal from anaylzer 25 is transmitted through line 27 to analyzer controller 26. The set point of analyzer controller 26 is set for the minimum value of purity desired. The output signal from analyzer controller 26 is inversely proportional to the purity of the product so that as product purity decreases, the output signal increases. The output signal from analyzer control 26 is transmitted in turn to high signal selector 28 through line 29 thence to low signal selector 21, through line 30 and finally to flow controller 11 through line 22. If the output signal is received by low signal selector 21 from pressure controller 18 is higher than the output signal from analyzer controller 26, then the latter is connected by selector 21 to flow controller 11 through line 22. The output signal received by the flow controller 11 modifies the set point of flow controller 11 in a direction to produce product of acceptable purity. By using low signal selector 21 and the inverse relation between operating pressure and output signal from pressure controller 18, the operating pressure in column 1 may be allowed to seek its natural value below its set-point because the output signal increases as the operating pressure decreases in value. Under these circumstances, the higher value of output signal from pressure controller 18 is isolated from flow controller 11 by low signal selector 21.

Now referring to the apparatus shown in FIG. 1 to the right of column 1, the overhead product flowing in pipe 32 is fed in series to condenser 33, pipe 35 to accumulator 34 and then to overhead product pipe 36. The reflux flow path is shown in token as pipe 37. It is assumed that the composition of the overhead product is controlled by manipulating flow of either the reflux or overhead product, and that the liquid level of the accumulator is controlled by manipulating that flow not used for composition control. Inasmuch as these are well known control practices and not part of this invention, they are not shown in FIGS. 1 and 2. As explained hereinabove, the available cooling by the condenser determines the pressure in column 1.

Now returning to the apparatus shown to the left of column 1, a line 39 is connected to line 20 to transmit the output signal from pressure controller 18 to a divider computer 38. A line 40 is connected to line 29 to transmit the output signal from analyzer controller 26 to another input of divider computer 38. The output from divider computer 38 is transmitted through line 42 to percent capacity indicator 41. The value indicated by percent capacity indicator 41 is an aid to the operator in evaluating the performance of column 1.

A local optimizing transmitter 43 is either manually or automatically set to generate a signal representative of cost factors of the local column. The output signal from the local optimizing transmitter 43 is transmitted to low signal selector 44 through line 45. A unit optimizing transmitter 47 is either manually or automatically set to generate a signal representative of cost factors of the multiple-unit fractionation system illustrated by connecting the product line 36 from column 1 to column 1' to receive the product through feed 2'. An example of cost factors involved in determining the setting for the signal generated by local optimizing transmitter 43 might be from a calculation to determine the optimum rate of flow of steam to column 1 for a predetermined rate of flow of feed of known composition to produce a desired rate of separation of product. An example of the cost factors involved in determining the setting for the signal generated by unit optimizing transmitter 47 might be to determine the optimum rate of flow of steam to column 1, taking into consideration that if less steam is used in the first column, more steam might be available for use downstream in other columns and thereby reduce the overall steam consumption for the system. The output signals from local optimizing transmitter 43 and unit optimizing transmitter 47 are continuous signals which may be varied in amplitude periodically when manually adjusted or varied continuously when automatically adjusted by signals from other instrumentation. The output signal from the unit optimizing transmitter 47 is transmitted to low signal 44 selector through line 48. Low signal selector 44 connects the lower of the output signal from either the local optimizing transmitter 43 or the unit optimizing transmitter 47 to high signal selector 28 through line 46. The output signal from the unit optimizing transmitter 47 has priority over the output signal from the local optimizing transmitter 43 and would be connected by low signal selector 44 to high signal selector 28 when it is the lower output signal. In like manner, high signal selector 28 connects the output signal transmitted through line 46 when the purity of the product is at the set-point value of analyzer controller 26 or better. However, when the product is less pure than the set-point value, then high signal selector 28 connects the output of analyzer controller 26 to low signal selector 21. Low signal selector 21 connects the output signal transmitted through line 30 to flow controller 11 except when the value of the pressure in column 1 exceeds its set-point value in pressure controller 18. Under this condition, selector 21 connects the output signal from pressure controller 18 to flow controller 11.

Reviewing the operation, low signal selector 44, high signal selector 28 and low signal selector 21 act in series to compare the output signals received and only transmit one of the output signals to flow controller 11 to modify its set-point value. A priority for applying output signals is thus provided. The priority established insures that when the purity of the product is maintained at or above the minimum value, then either the output signal from unit optimizing transmitter 47 or local optimizing tramsmitter 43 is utilized to modify the set-point value of flow controller 11 and thus optimize the product cost. However, when the purity falls below the minimum value represented buy the set-point value, then the output signal from analyzer controller 26 is utilized to increase the rate of flow of steam to return the product to the desired minimum purity value. At any time that the operating pressure exceeds the safe maximum limit time that the operating pressure exceeds the safe maximum limit represented by the set-point value, then the output signal from pressure controller 18 is utilized to decrease the rate of steam flow and thus reduce the operating pressure to a safe value.

Now again turning to the apparatus shown to the right of column 1, a differential pressure transmitter 49 is connected on one side by pipe 50 to column 1 and on the other side by pipe 51 to pipe 32 near the condenser 33. The differential pressure thus sensed at the spaced apart points by the differential pressure transmitter 49 is proportional to the velocity of fluids flowing in column 1. The term "fluid" is used in relation to the flow in column 1 to mean a fluid in any phase or degree of saturation. Connection may be made to column 1 at other spaced apart points, but the locations disclosed in FIG. 1 are preferred locations because piping and calibration are facilitated.

The output signal from differential pressure transmitter 49 is transmitter through line 53 to differential pressure controller 52. The set-point of differential controller 52 is adjusted to a value slightly less than the velocity in the column 1 at which flooding is known or expected to occur. The term "flooding" is used to mean the spillage of liquid caused by an excess of liquid collecting in the tray of the column. The output signal from differential pressure controller 52 is transmitted to control valve 54, regulating the flow of overhead product to condenser 33. Restricting of the flow of overhead product to condenser 33 increases the column pressure and reduces the velocity of vapor flowing through the column sufficiently to prevent flooding from occurring.

To increase the restricting effect, a by-pass pipe 56 may be added which by-passes condenser 33 by connecting overhead product pipe 32 to condenser output pipe 35. A control valve 57 is inserted in by-pass line 56 and the output signal from differential pressure controller 52 is transmitted through lines 55 and 58 to control valve 57. Control valve 54 is arranged to move towards its closed position by an increase in the output signal while control valve 57 is arranged to move towards its open position by the increase. Control valve 54 starts to close and control valve 57 starts to open only when the differential pressure is above its set-point value and diverts a portion of the overhead product from flowing through condenser 33 to by-pass line 56. This simultaneous but opposite action of the control valves 54 and 57 effectively and rapidly reduces the affect of condenser 33 on the column pressure, i.e., by condensing only a portion of the overhead product, the pressure reduction caused by the condensing process is reduced and thereby the column pressure is increased.

In operation, the heat-input to reboiler 3 is controlled by flow controller 11 and modified by the value of the other variables on an established priority through the actuation of selector 21, 28 and 44 as described more fully hereinabove. By these selectors and the established position each of the variables having lessor priorities can exercise control over the operation of the column during the time the more important variables are on the acceptable side of their set-point values. In the event the vapor velocity approaches a flooding condition, then the differential pressure controller 52 acts to increase column pressure and reduce the vapor velocity to a value at which the column will operate without flooding. The embodiment of the invention in FIG. 1 is preferred for the distillation of heavier products such as pentanes.

Figure 2:
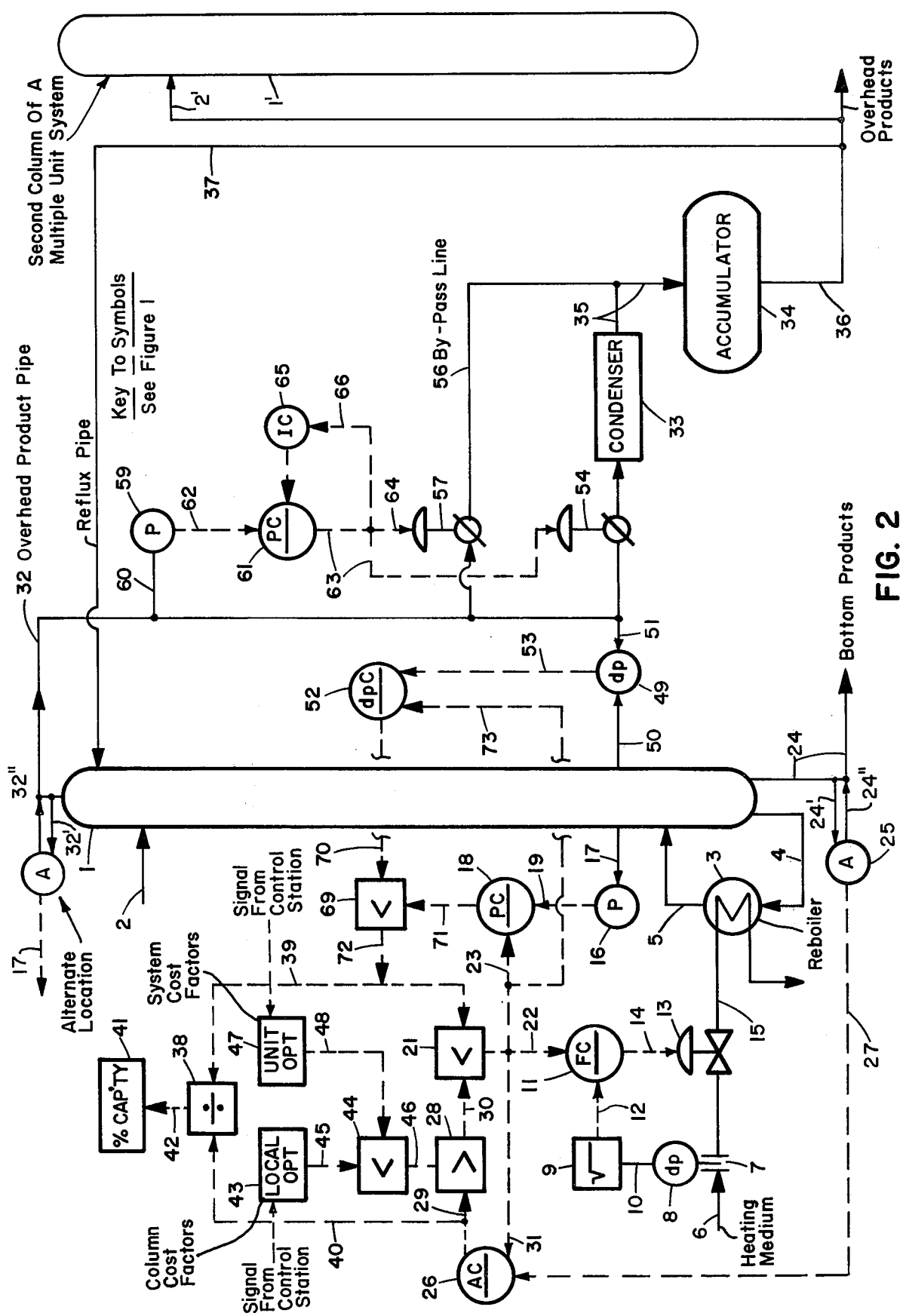
FIG. 2 is a diagramatic showing of a fractionation column and control system suitable for separating relatively light distillates such as propane.

Now turning to FIG. 2, the system disclosed is the same as that of FIG. 1 except for the manner in which the column pressure is controlled to prevent a flooding condition. For controlling the flow of overhead products to condenser 33, a pressure transmitter 59 is connected to pipe 32 by pipe 60 so as to sense the pressure in pipe 32. The output signal from pressure transmitter 59 69 is transmitted through line 62 to pressure controller 61.

When the capacity of condenser 33 remains constant, it will not affect the stability of the operation of column 1. Under stable conditions, the set-point of pressure controller 61 is adjusted so that its output signal will maintain control valve 54 in a substantially full open condition and control valve 57 in a fully closed condition. However, when the capacity of condenser 33 is changed suddenly by a change in atmospheric temperature or in cooling medium, such as a cooling storm, valves 54 and 57 must be adjusted to reduce the flow of overhead product and thus maintain the column pressure at a constant value. But then column pressure will no longer be at its minimum value. To bring the pressure down to a new minimum the set-point of pressure controller 61 must be readjusted until valve 54 is fully open and valve 57 is fully closed so that the full capacity of condenser 33 is utilized. In order to accomplish this an integrating controller 65 is used. Integrating controller 65 receives the output signal from pressure controller 61 through lines 63 and 66 and the output signal from integrating controller 65 modifies the set-point of pressure controller 61. In operation, the set-point of integrating controller is set at the value which, under stable conditions will maintain control valves 54 and 57 in the condition described hereinabove. When an unstable condition exists, the output of pressure controller 61 will change. Integrating controller 65 integrates the changing output signal and slowly changes the set-point of pressure controller 61 to bring the pressure back to a minimum condition.

In FIG. 2, the output of differential pressure controller 52 is connected to low signal selector 69. The output of pressure controller 18 is also connected to the low signal selector 69 instead of to low signal selector 21 as in FIG. 1. When the input signal from differential pressure transmitter 49 transmitted to differential pressure controller 52 is at or above the set-point value of the differential pressure controller 52 indicating approaching flooding condition, the output signal from the differential pressure controller 52 is connected by selector 60 through lines 72 and 39 to low signal selector 21. In this embodiment, an output signal from differential pressure controller 52 denoting approaching flooding condition exercises priority over the output signal from analyzer controller 26 in modifying the set-point value of flow controller 11 to reduce the rate of heat-input. In like manner, when the operating pressure of column 1 reaches its safe limit, the output signal from pressure controller 18 is connected by low signal selector 69 and lines 72 and 39 to low signal selector 21 and exercises priority over the output signal from analyzer controller 26 in modifying the set point value of flow controller 11 to reduce the rate of heat-input. This embodiment of the invention in FIG. 2 is preferred for distillation of lighter products such as propane.

In FIGS. 1 and 2, the output signal connected to flow controller 11 by low signal selector 21 is transmitted through line 23 to pressure controller 18, through line 31 to analyzer controller 26 and in FIG. 2 through line 73 to differential pressure controller 52. This transmission of the output signal to the controllers, conditions each of the controllers so when any one of the controllers is not connected to the flow controller 11, the integrating circuit in that controller will not cause wind-up, but is in condition for transfer to the set-point means of heat-input controller 11 without causing a sudden bump or change in the set-point of the flow controller 11. The term wind-up is used to mean the saturation of the integrating circuit which occurs during the time in which a variable may be off the set-point value for long periods and when such occurs will result in stabilizing the variable at an erroneous value.

Figure 3:
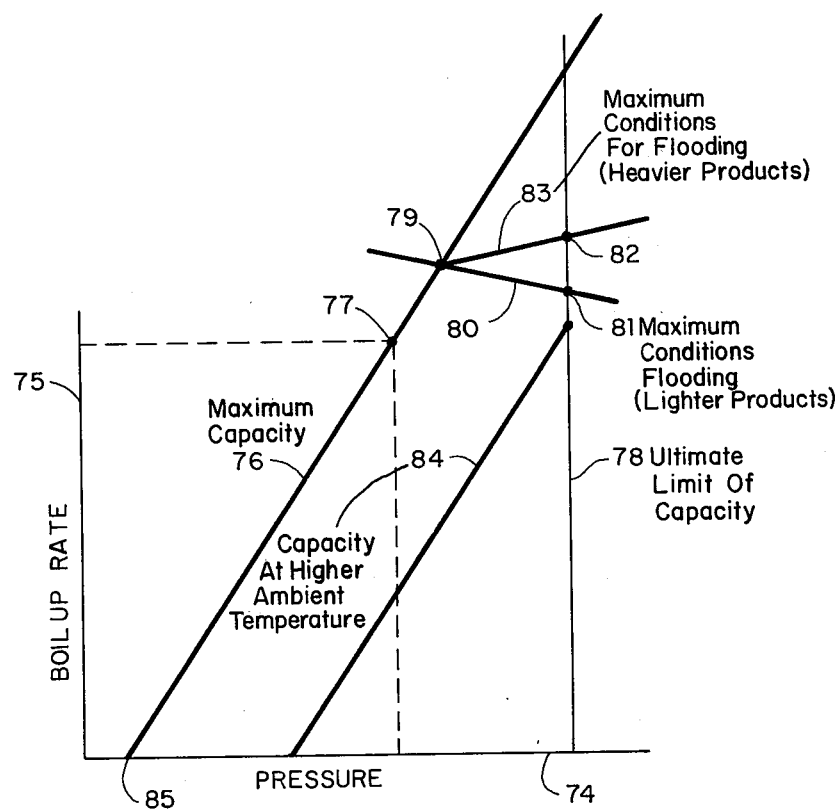
FIG. 3 is a graph showing the relationship of the condenser to column pressure and boilup rate.

Now turning to FIG. 3, the graph is a plot showing the relation between boilup on vertical ordinate 75 and column pressure on coordinate 74. As explained earlier herein, the column pressure is dependent on the capacity of the condenser and heat-input. Line 76 represents the boilup rate relation to column pressure when operating the condenser at its maximum capacity. The capacity of a condenser changes with changes in the ambient temperature or cooling medium. Line 84 represents the capacity of the condenser at higher ambient temperature and line 78 the ultimate limit of that capacity. Line 80 represents the maximum boilup rate and column pressure conditions at which flooding occurs for lighter products, such as propane. The optimum control is along line 80 for the available condenser capacity. For these lighter products, the boilup rate at flood conditions decreases from point 79 to point 81 while column pressure increases. Line 83 represents the maximum boilup rate and column pressure conditions at which flooding occurs for heavier products, such as pentanes. The optimum control is along line 83 for the available condenser capacity. For these heavier products, the boilup rate at flood conditions increases from point 79 to point 82 while column pressure increases. From this graph, it can be seen that in the separation of heavier products, flooding may be prevented by increasing column pressure as shown and described in relation to FIG. 1 and that in the operation of lighter products, flooding may be prevented by decreasing boilup rate by reducing the heat-input as shown and described in relation to FIG. 2. In the claims, the term "said rate" refers to the rate of flow of heating mediums unless the term is followed by a modifier which identifies the flow of a different medium. Also in the claims, the term "output" as used in "output means" refers to the output signal produced by a control means.

What I claim is:

1. The method of maximizing capacity and optimizing product cost of a distillation column which utilizes a reflux condenser that receives and condenses overhead fluids from the column to maintain the operating pressure in the column at a minimum value, which method comprises:
   1. producing a flow control signal and utilizing that control signal to regulate the rate of flow of heating medium to said column to maintain said rate at a preselected set-point value;
   2. producing a pressure control signal which is inversely proportional to said operating pressure and utilizing that control signal to modify said rate in a direction to increase said rate when said operating pressure is below a preselected set-point value representative of a safe maximum limit and to decrease said rate when said operating pressure exceeds said set-point value;
   3. producing a purity control signal which is proportional to the purity of a product of said column and utilizing that signal to modify said rate in a direction to increase said rate when said purity is below a preselected set-point value representative of a minimum acceptable purity value and to decrease said rate when said purity is above said set-point value;
   4. producing a cost factor control signal which is a function of cost factors relating to the production of said product and utilizing that control signal to modify said rate in a direction to optimize said product cost;
   5. utilizing only one of said latter three named control signals at any time to modify said rate by a selective process wherein said purity control signal is compared with cost factors control signal and the higher of these control signals is selected and compared with said pressure control signal and the lower of these latter compared control signals is utilized to modify said rate, whereby only said cost factor control signal will be selected utilized to modify said rate when that control signal exceeds said purity control signal but is less than said pressure control signal and will modify said rate to maintain said rate at a value that will result in optimizing the product cost during such time as said purity exceeds said set-point value representative of a minimum acceptable purity value and said operating pressure is below said set-point value representative of said safe maximum limit, only said purity control signal will be selected to modify said rate when that control signal is below said set-point value representative of said minimum acceptable purity value and will increase said rate to return said purity to said minimum acceptable value during such time as said operating pressure is below said set-point value representative of said safe maximum limit, and only said pressure control signal will be selected to modify said rate when the operating pressure exceeds said set-point value representative of said safe maximum limit and will reduce said rate to return said operating pressure to said safe maximum limit; and 6. producing a velocity control signal which is proportional to the velocity of fluids flowing in said column and utilizing that control signal to reduce said velocity when the value of said velocity exceeds a set-point value representative of approaching flooding conditions to thereby prevent flooding from occurring.

2. The method of claim 1 wherein in step (3) said purity control signal is proportional to the purity of the bottom product of said column and
   in step (6) said velocity control signal is utilized to reduce the rate of flow of overhead product as the means for reducing said velocity.

3. The method of claim 1 wherein:
   in step (3) said purity control signal is proportional to the purity of the overhead product of said column;
   in step (6) said velocity control signal is inversely proportional to said velocity and is utilized to modify said rate of flow of heating medium in a direction to decrease said rate when said velocity is above said set-point value representative of approaching flooding conditions, and
   in step (5) said velocity control signal is included with said latter three named control signals in said selective process, wherein said velocity control signal is compared with said pressure control signal and the lower of these control signals is then compared with the higher control signals selected by comparison of said purity control signal and said cost factor control signal and the lower of these latter compared signals is utilized to modify said rate, whereby
   only said velocity control signal will be selected utilized to reduce said rate when that said velocity exceeds said set-point value representative of said approaching flooding condition to prevent flooding from occurring during such time as said operating pressure is below said set-point value representative of said safe maximum limit.

4. The method of claim 3 in addition said method comprises;

8. producing a second pressure control signal which is proportional to said operating pressure and utilizing that control signal to reduce the flow of overhead product to said reflux condenser to maintain said operating pressure at a set-point value representative of a preselected minimum value to thereby counteract sudden changes in the condensing capability of said reflux condenser.

5. The method of claim 4 wherein said distillation column is one of a multiple column distillation system and wherein;

in step (4) said cost factor control signal is a function of cost factors related to said system;

in step (7) producing a local cost factor control signal which is a function of cost factors related to said column and utilizing that signal to modify said rate in a direction to optimize the product cost of said column; and in step (5) said local cost factor control signal is included with said latter three named control signals in said selective process, wherein said cost factor control signal is compared with said local cost factor control signal and the lower of these control signals is then compared with said purity control signal, whereby only the lower of said compared cost factor control signals and local cost factor control signal will be selected to modify said rate when said lower cost factor control signal exceeds said purity control signal but is less than said pressure control signal and will modify said rate to maintain said rate at a value that will result in optimizing said product cost during such time as said purity exceeds said set-point value representative of a minimum acceptable purity value and said operating pressure is below said set-point value representative of said safe maximum limit.

6. The method of claim 1 wherein said distillation column is one of the columns of a multiple column distillation system and wherein:

in step (4) said cost factor control signal is a function of cost factors related to said system and wherein in addition said method comprises:

7. producing a local cost factor control signal which is a function of cost factor related to said column and utilizing that signal to modify said rate in a direction to optimize the product cost of said column; and in step (5) said local cost factor control signal is included with said latter three named control signals in said selective process, wherein said cost factor control signal is compared with said local cost factor control signal and the lower of these control signals is then compared with said purity control signal, whereby only the lower of said compared cost factor control signal and local cost factor control signal will be relected to modify said rate when said lower cost factor control signal exceeds said purity control signal but is less than said pressure control signal and will modify said rate to maintain said rate at a value that will result in optimizing said product cost during such time as said purity exceeds said set-point value representative of a minimum acceptable purity value and said operating pressure is below said set-point value representative of said safe maximum limit.

7. The method of claim 1 wherein; in step (6) said reduction in velocity is accomplished by reducing the flow of overhead product to said reflux condenser.

8. The method of claim 7 wherein said distillation column is one of the columns of a multiple column distillation system and wherein;

in step (3) said purity control signal is proportional to the purity of the bottom product of said column;

in step (4) said cost factor control signal is a function of cost factors related to said system;

7. producing a local cost factor control signal which is a function of cost factors related to said column and utilize that signal to modify said rate in a direction to optimize the product cost of said column; and in step (5) said local cost factor control signal is included with said latter three named control signals in said selective process, wherein said cost factor control signal is compared with said local cost factor control signal and the lower of these cost factor control signals is then compared with said purity control signal, whereby only the lower of said compared cost factor control signal and local cost factor control signal will be selected utilized to modify said rate when said lower cost factor control signal exceeds said purity control signal but is less than said pressure control signal and will modify said rate to maintain said rate at a value that will result in optimizing said product cost during such time as said purity exceeds said set-point value representative of a minimum acceptable purity value and said operating pressure is below said set-point value representative of said safe maximum limit.

9. The method of claim 2 wherein;

said distillation column is one of the columns of a multiple column distillation system and wherein;

in step (3) said purity control signal is proportional to the purity of the overhead product of said column;

in step (4) said cost factor control signal is a function of cost factors related to said system; and wherein in addition said method comprises 7. producing a local cost factor control signal which a function of cost factors related to said column and utilize that signal to modify said rate in a direction to optimize the product cost of said column; and in step 6. said velocity control signal is inversely proportional to said velocity and is utilized to modify said rate of flow of heating medium in a direction to decrease said rate when said velocity is above said set-point value representative of approaching flooding conditions, and in step (5) said local cost factor control signal and said velocity control signal are included with said latter three named control signals in said selective process, wherein said cost factor control signal is compared with said local cost factor control signal and the lower of these cost factor control signals is then compared with said purity control signal, and wherein said velocity control signal is compared with said pressure control signal and the lower of these last mentioned control signals is then compared with the higher of the control signals selected by comparison of said purity control signals said cost factor control signal and local cost factor control signal and the lower of these latter compared signals is utilized to modify said rate, whereby only the lower of said compared cost factor control signal and local cost factor control signal will be selected to modify said rate when said lower cost factor control signal exceeds said purity control signal but is less than said pressure control signal and said velocity control signal and will modify said rate to maintain said rate at a value that will result in optimizing said product cost during such time as said purity exceeds said setpoint value representative of a minimum acceptable purity value and said operating pressure is below said set-point value representative of said safe maximum limit and said velocity is above said set-point value representative of approaching flooding conditions, and only the lower of said velocity control signal will be selected to reduce said rate when that said velocity exeeds said setpoint value representative of said approaching flooding condition to prevent flooding from occurring during such time as said operating pressure is below said set-point value representative of said safe maximum limit.

10. The method of claim 1 wherein in addition said method comprises:

9. producing an indication of the ratio of said pressure control signal to said purity control signal as a representation of the percentage of capacity at which said column is operating.

11. Control apparatus for maximizing capacity and optimizing product cost of a distillation column that has associated therewith a source of fluid feed arranged to flow into said column, a source of heat arranged to heat the fluid in said column and a reflux condenser arranged to receive and cool overhead fluids flowing out of said column, comprising, in combination:

heat controller for controlling the rate of heat-input to said column,
    said heat controller having set-point means for establishing the rate at which said heat-input is controlled and
    output means for producing an output signal proportional to said rate;
pressure controller for controlling the operating pressure of said column,
    said pressure controller having,
    set-point means for establishing a preselected safe maximum operating limit at which said operating pressure is controlled and
    output means for producing an output signal inversely proportional to said operating pressure;
analysis controller for controlling the purity of a product of said column,
    said analysis controller having;
    set-point means for establishing a preselected minimum acceptable purity value of said product at which said purity is controlled and
    output means for producing an output signal proportional to said purity;
cost factor signal generator for producing an output signal representative of cost factors relating to the production of a product of said column;
selector means for selectively connecting only one of said output signals at any time to the set-point means of said heat controller to modify the value at which said rate of heat-input is controlled.

said selector means including a first and second selector,
said first selector being adapted to connect the higher one of the output signals from said cost factor signal generator and said analysis controller to said second selector,
said second selector being adapted to connect the lower one of said output signals from said first selector and said output signal from said pressure controller to the set-point means of said heat controller, whereby only said output signal from aid cost factor signal generator will be connected to said set-point means of said heat controller to modify said rate when that output signal from said cost factor signals generator exceeds said output signal from said analysis controller but is less than said output signal from said pressure controller and to thereby modify said rate to maintain said rate at a value that will result in optimizing product cost during such time as said purity exceeds said set-point value representative of said minimum acceptable purity value and said operating pressure is below said set-point value representative of said safe maximum light, only said output signal from said analysis controller will be connected to said set-point means of said heat controller to modify said rate when that output signal of said cost factor signal generator is below said set-point value representative of said minimum acceptable purity value and said output signal said analysis controller will increase said rate to return said purity to said minimum acceptable value during such time as said operating pressure is below said set-point value representative of said safe maximum limit, only said output signal from said pressure controller will be connected to said set-point means of said heat controller to reduce said rate when said operating pressure exceeds said set-point value representative of said safe maximum limit and will decrease said rate to return said operating pressure to said safe maximum limit; and velocity control means for controlling the velocity of fluids flowing in said column,
    said velocity control means having;
    a set-point means for establishing a value of said velocity which indicates approaching flooding condition, and
    an output means for producing an output signal proportional to said velocity;
    the output signal from said velocity control means being arranged to reduce said velocity when the velocity exceeds its set-point value to thereby prevent flooding from occurring.

12. Control apparatus in accordance with claim 11 in which,
    said analysis controller output means produces an output signal which is proportional to the purity of the bottom product of said column.

13. Control apparatus in accordance with claim 11 in which,
    said analysis controller output means produces an output signal which is proportional to the purity of the overhead product of said column;
    said velocity control output means produces an output signal which is inversely proportional to said velocity;

and wherein said selector means includes a third selector;

said third selector being adapted to connect the lower one of the output signals from said velocity controller and from said pressure controller to said second selector;

said second selector being adapted to connect the lower one of said output signals from said third selector and the higher of output signals from said second selector to the set-point means of said heat controller, whereby only said output signal from said velocity controller will be connected to said set-point means of said heat controller to modify said rate when that output signal from said velocity controller exceeds said set-point value representative of approaching flooding conditions during such times as said operating pressure is below said set-point value representative of said safe maximum limit to reduce said velocity when the velocity exceeds its set-point to thereby prevent flooding from occurring; and only said output signal from said pressure controller will be connected to said set-point means of said heat controller to reduce said rate when said operating pressure exceeds said set-point value representative of said safe maximum limit.

14. Control apparatus in accordance with claim 13 in which
said combination includes,
second pressure controller for controlling the operating pressure of said column,
said second controller having;
set-point means for establishing a minimum set-point pressure value which indicates approaching flooding condition,
output means for producing an output signal proportional to said operating pressure and,
integrating control means adapted to modify said set-point means in accordance with variations in said output signal with respect to time,
said output signal from said second pressure controller being arranged to reduce the flow of overhead product to said reflux condensor when said operating pressure exceeds said minimum set-point value indicating approaching flooding condition to thereby prevent flooding from occurring.

15. Control apparatus in accordance with claim 14 in which,
said analysis controller output means produces an output signal which is proportional to the purity of the overhead products of said column;
said distillation column is one of the columns of a multiple column distillation system;
said cost factor signal generator comprises
a local cost factor signal generator for producing an output signal representative of system cost factors relating to the operation of said column; and
in which said combination includes:
a unit cost factor signal generator for producing an output signal representative of cost factor relating to the operation of said system; and
said selector means includes a fourth selector,
said fourth selector being adapted to connect the lower one of the output signals from said local cost factor signal generator and
said unit cost factor signal generator to said first selector,
said first selector being adapted to connect the higher one of said output signal from said fourth selector and said analysis controller to said second selector, whereby,
only the lower one of said output signals from said local cost factor signal generator and said unit cost factor signal generator will connected to said set-point means of said heat controller to modify said rate when that lower output signal exceeds said output signal from said analysis controller but is less than said output signal from said pressure controller to thereby modify said rate to maintain said rate at a value that will result in optimizing product cost during such time as said purity exceeds said set-point value representative of said minimum acceptable purity value and said operating pressure is below its set-point value representative of said safe maximum limit.

16. Control apparatus in accordance with claim 14 in which,
said analysis controller output means produces an output signal which is proportional to the purity of the bottom products of said column;
said cost factors signal generator comprises
a local cost factor signal generator for producing an output signal representative of systems cost factors relating to the operation of said column
a unit cost factor signal generator for producing an output signal representative of cost factors relating to the operation of said system; and
said selector means includes a fourth selector,
said fourth selector being adapted to connect the lower one of the output from said lower cost factor signal generator and
said unit cost factor signal generator to said first selector,
said first selector being adapted to connect the higher one of said output signal from said fourth selector and said analysis controller to said second selector, whereby,
only the lower one of said output signals from said cost factors signal generator and said unit cost factor signal generator will connected to said set-point means of said heat controller to modify said rate when that lower output signal exceeds said output signal from said analysis controller but is less 17. Control apparatus in accordance with claim 14 in which,
said pressure controller includes proportional and integral control modes,
said analysis controller includes proportional and integral control modes, and
said velocity controller includes proportional and integral control modes,
and in which said combination includes
first feedback connection means for connecting the output signal which is selectively connected to said set-point means of said heat controller by said second selector of said selector means to said pressure controller to thereby condition said pressure controller in a manner to prevent integral wind-up from occurring.
second feedback connection means for selectively connecting the output signal which is selectively connected to said set-point means of said heat controller by said second selector of said selector means to said analysis controller to thereby condition said analysis controller in a manner to prevent integral wind-up from occurring, and third feedback connection means for connecting the output signal which is selectively connected to said set-point means of said heat controller by said second selector of said selector means to said velocity control means to thereby condition said velocity control means in a manner to prevent integral winding from occurring.

18. Control apparatus in accordance with claim 11 in which, said distillation column is one of the columns of a multiple column distillation system
and in which said combination includes:
a unit cost signal factor generator for producing an output signal representative of cost factors relating to the operation of said system; and
said selector means includes a fourth selector,
said fourth selector being adapted to connect the lower one of the output signals from said cost factor signal generator
and said unit cost factor signal generator to said first selector,
said first selector being adapted to connect the higher one of said output signals from said fourth selector and said analysis controller to said second selector, whereby,
only the lower one of said output signals from said cost factor signal generator and said unit cost factor signal will be connected to said set-point means of said heat controller to modify said rate when that lower output signal exceeds said output signal from said analysis controller but is less than said output signal from said pressure controller to thereby modify said rate to maintain said rate at a value that will result in optimizing product cost during such time as said purity exceeds said set-point value representative of said minimum acceptable purity value and said operating pressure is below its set-point value representative of said safe maximum limit.

19. Control apparatus in accordance with claim 11 in which,
the output signal from said velocity controller is arranged to reduce the flow of overhead product to said reflux condenser when said velocity exceeds its set-point value to thereby prevent flooding from occurring.

20. Control apparatus in accordance with claim 19 in which,
said analysis controller output means produces an output signal which is proportional to the purity of the bottom product of said column;
said distillation column is one of the columns of a multiple column distillation system;
said cost factor signal generator comprises;
a local cost factor signal generator for producing an output signal representative of cost factors relating to the operation of said column and
a unit cost factor signal generator for producing an output signal representative of column cost factors relating to the operation of said system; and
said selector means includes a fourth selector,
said fourth selector being adapted to connect the lower one of the output signals from said local cost factor signal generator and
said unit cost factor signal generator to said first selector,
said first selector being adapted to connect the higher one of said output signals from said fourth selector and said analysis controller to said second selector, whereby,
only the lower one of said output signals from said local cost factor signal generator and said unit cost factor generator will be connected to said set-point means of said heat controller to modify said rate when that lower output signal exceeds said output signal from said analysis controller but is less than said output signal from said pressure controller to thereby modify said rate to maintain said rate at a value that will result in optimizing produce cost during such time as said purity exceeds said set-point value representative of said minimum acceptable purity value and said operating pressure is below its set-point value representative of said safe maximum limit.

21. Control apparatus in accordance with claim 19 in which,
said analysis controller output means produces an output signal which is proportional to the purity of the overhead product of said column;
said distillation column is one of the columns of a multiple column distillation system;
and in which said combination includes:
said cost factor signal generator comprises
a local cost factor signal generator for producing an output signal representative of system cost factor relating to the operation of said column, and
a unit cost factor signal generator for producing an output signal representative of column cost factor relating to the operation of said system; and
said selector means includes a fourth selector,
said fourth selector being adapted to connect the lower one of the output signals from said local cost factor signal generator and
said unit cost factor signal generator to said first selector,
said first selector being adapted to connect the higher one of said output signal from said fourth selector and said analysis controller to said second selector, whereby,
only the lower one of said output signals from said local cost factor signal generator and said unit cost factor signal generator will connected to said set-point means of said heat controller to modify said rate when that lower output signal exceeds said output signal from said analysis controller but is less than said output signal from said pressure controller to thereby modify said rate to maintain said rate at a value that will result in optimizing product cost during such time as said purity exceeds said set-point value representative of said minimum acceptable purity value and said operating pressure is below its set-point value representative of said safe maximum limit.

22. Control apparatus in accordance with claim 19 in which,
said pressure controller includes proportional and integral control modes, and
said analysis controller includes proportional and integral control modes,
and in which said combination includes first feedback connection means for connecting the output signal which is selectively connected to said set-point means of said heat controller by said second selector of said selector means to said pressure controller to thereby condition said pressure controller in a manner to prevent integral wind-up from occurring, and second feedback connection means for selectively connecting the output signal which is selectively connected to said set-point means of said heat controller by said second selector of said selector means to said analysis controller in a manner to prevent integral wind-up from occurring, than said output signal from said pressure controller to thereby modify said rate to maintain said rate at a value that will result in optimizing product cost during such time as said purity exceeds said set-point value representative of said minimum acceptable purity value and said operating pressure is below its set-point value representative of said safe maximum limit.

23. Control apparatus in accordance with claim 11 in which said combination includes, ratio computer adapted to receive the output signals from said analysis controller and said pressure controller and produce an output signal indicative of the ratio of said output signals, and an indicator adapted to receive the output from said ratio computer and indicate the value thereof on a scale in term of percent of capacity at which said column is operating.

* * * * *